United States Patent [19]
Dugan et al.

[11] Patent Number: 6,078,586
[45] Date of Patent: Jun. 20, 2000

[54] ATM VIRTUAL PRIVATE NETWORKS

[75] Inventors: Andrew J. Dugan, Superior, Colo.;
David E. McDysan, Richardson, Tex.

[73] Assignee: MCI Communications Corporation, Washington, D.C.

[21] Appl. No.: 09/128,495

[22] Filed: Aug. 3, 1998

[51] Int. Cl.[7] .............................. H04J 3/12; H04Q 11/00
[52] U.S. Cl. .................... 370/395; 370/254; 370/410; 370/399
[58] Field of Search ..................... 370/395, 397, 370/399, 408, 409, 410, 426, 522, 230, 231, 236, 252, 400, 401; 379/230, 231, 370, 379

[56] References Cited

U.S. PATENT DOCUMENTS

| | | | |
|---|---|---|---|
| 5,490,141 | 2/1996 | Lai et al. | 370/395 |
| 5,517,497 | 5/1996 | Le Boudec et al. | 370/395 |
| 5,737,333 | 4/1998 | Civanlar et al. | 370/395 |
| 5,781,529 | 7/1998 | Liang et al. | 370/397 |
| 5,828,844 | 10/1998 | Civanlar et al. | 370/395 |
| 5,867,498 | 2/1999 | Gillman et al. | 370/522 |
| 5,933,412 | 8/1999 | Choudhury et al. | 370/397 |

*Primary Examiner*—Chi H. Pham
*Assistant Examiner*—Steven Nguyen

[57] ABSTRACT

A network architecture and service platform for providing virtual private network services ("VPN") over an ATM network. The architecture provides services for voice, video, and data traffic among multiple VPN customers over a shared ATM network by implementing intelligent control devices to perform enhanced processing of ATM call setup messages, including validations and routing translations. Hierarchical routing mechanisms provided by ATM, along with customized customer addressing schemes, are used to overlay customer VPNs as higher-level networks onto the shared ATM network. The control devices translate customer ATM VPN address to internal ATM network addresses. The ATM switch network then performs lower-level network processing, using internal network addressing, to setup a virtual connection for a VPN call. The intelligent control devices may also explicitly state the end-to-end route.

22 Claims, 8 Drawing Sheets

ATM VIRTUAL PRIVATE NETWORKS

FIELD OF THE INVENTION

The present invention relates generally to communication networks and service providers, and specifically, to a network architecture providing virtual private network services to multiple customers over a common, shared ATM network.

BACKGROUND OF THE INVENTION

Asynchronous Transfer Mode (ATM) technology enables a carrier to provide integrated data, video, and voice services over a single network. In accordance with standard ATM technology, a shared ATM network 10, such as shown in FIG. 1, transfers and routes video, data, and voice traffic in 53 byte fixed-length packets from a source 12 to a destination 15 over a series of ATM switches 20a–g and interconnected links. The capability of carrying multi-media traffic on a single network makes ATM the preferred technology for B-ISDN services. The Asynchronous Transfer Mode protocol is connection oriented, and traffic for an ATM "call" is routed as cells over a virtual connection that extends from the source to the destination.

As known, a virtual connection is comprised of Virtual Channels (VC) and Virtual Paths (VP) in a multiplexing hierarchy. A physical transmission system is partitioned into multiple VCs and VPs, with some being designated for customer traffic (bearer channels) and some being designated for signaling. A VC is identified by a Virtual Channel Identifier (VCI), and a VP is identified by a Virtual Path Identifier (VPI). Prior to transmitting traffic over a bearer channel, the ATM network sets up an ATM call with signaling messages over a signaling channel. First, a setup message containing a Source Address ("SA"), representing the location of the call originator, and a Destination Address ("DA"), representing the location of the call recipient, is received and processed by an originating ATM switch, e.g., switch 20a. The originating ATM switch routes the setup message to a terminating ATM switch, e.g., switch 20f, via zero or more intermediate switches, in which the terminating ATM switch 20f serves the DA. Each ATM switch processes the setup message to ensure that it recognizes the DA and can route the call.

From each switch's processing of the setup message, a virtual connection is established from source to destination to transport the customer traffic as cells over bearer channels. A virtual path or channel connection (VPC or VCC) refers to one or more concatenated links, one of which is depicted as link 25 shown in FIG. 1 connecting two ATM switches. A VP or VC link is defined as the transport between a point at which a VPI/VCI is assigned and a point at which a VPI/VCI is removed or translated. Specifically, at the inbound port of a switch, the VCI/VPI is used to determine the outbound port. The cell is then switched to an outboard port of the switch where a VCI/VPI is assigned to the cell. The cell is then transported to the next switch. Thus, a connection (VCC/VPC) extends from the source, usually the inbound port on the originating ATM switch, to the destination, usually the outbound port on the terminating ATM switch.

The signaling protocol is defined in ATM standards according to network interfaces. As shown in FIG. 2, the ATM Forum has defined, among other interfaces, a public User-Network Interface ("UNI") 50, defined as the interface between an ATM user and a public ATM network; a private User-Network Interface 55, defined as the interface between an ATM user and a private ATM network; and, a Private Network-Network Interface ("PNNI") 60 defined as the network-network interface between two private networks or switching systems. A description of the signaling procedures over the UNI interface can be found in ATM Forum "User Network Interface Signaling Specification", V4.0, July 1996, the contents of which are incorporated by reference herein and, a description of the signaling procedures over the PNNI interface can be found in ATM Forum "Private Network-Network Interface Specification", V. 1.0, March, 1996, the contents of which are incorporated by reference herein. Various features of ATM are enabled by signaling messages defined by these interfaces.

One standard feature of ATM PNNI is hierarchical routing. If an ATM switch cannot route to a DA for some reason, e.g., a congested link, it routes the setup message to an alternate address, as part of a hierarchical routing scheme. Two standard features provided by the PNNI standard are: 1) the Designated Transit List ("DTL") which is a list of network node identifiers and optional port identifiers that describe a complete route across the network and is typically provided by an originating ATM switch, and passed to each subsequent node or switch in the setup message; and, 2) crankback, which is a mechanism that causes an ATM switch (or other processing node) to return a setup message to a previous node if it cannot process or further route the setup message due to congestion link failure or node failure.

Presently, ATM networks are most commonly used as private networks, i.e., they are either owned and operated by an exclusive user, or they are owned/operated by a carrier that provides network services to customers. There are many benefits of using a private network for a customer. These include network security, custom rates and billing, abbreviated dialing and other custom calling features, and closed user groups. However, private networks and private network services are very expensive and require extensive management.

Shared network services offer these same features along with the advantages of lower costs through more efficient use of network resources, and carrier management. However, while an ATM network may be shared among multiple customers, data network security is a significant problem as there is nothing to ensure that a customer's traffic does not get routed to or intercepted by another customer. Basic shared network services are also limited in the custom calling features and account management services that can be offered.

To alleviate the problem, Virtual Private Networks ("VPN") have been developed which currently offer circuit-switched voice services to communications customers and provide the benefits of a private network coupled with the efficiencies, lower costs, and carrier management of a shared network.

Currently, there are no effective means for using a common, shared ATM network for VPN services to multiple customers for data and video, as well as voice, much less a shared ATM network for VPN services that provides security to prevent multiple customers connected to the shared ATM network from routing traffic to or receive traffic from, other customers.

SUMMARY OF THE INVENTION

The present invention is a network architecture and service platform for providing VPN services over a shared ATM network and particularly, provides custom services for voice, data, and video traffic for multiple customer VPNs over a shared ATM network.

Particularly, the invention implements intelligent peripherals, called Intelligent network Control Processors ("ICPs"), to perform enhanced processing of ATM call setup messages. The processing implemented in the ICPs comprises the validation of VPN addresses and routing translations. Hierarchical routing mechanisms provided by ATM and customized customer addressing schemes are used to overlay customer VPNs as higher-level networks onto a shared ATM network. The ICPs perform higher-level network processing; in particular, translating a customer ATM VPN address to an internal ATM network address. An ATM switch network then performs lower-level network processing, using internal network addressing, to setup a virtual connection for a VPN customer call.

Advantageously, the network architecture provides VPN services within a public ATM network and offers several intelligent services and enhanced calling features in addition to a basic VPN service. These offered services include intelligent call routing to multiple destinations, enhanced overflow routing, scheduled routing, load balancing, conferencing (including multi-media conferencing), dynamic call routing, account management such as customized billing and reporting, ATM bandwidth management features, Intranet/extranet authentication, screening and closed user groups, and many others.

The various features of novelty which characterize the invention are pointed out with particularity in the claims annexed to and forming a part of the disclosure. For a better understanding of the invention, its operating advantages, and specific objects attained by its use, reference should be made to the drawings and descriptive matter in which there are illustrated and described preferred embodiments of the invention.

DESCRIPTION OF THE PREFERRED EMBODIMENT

Figure 1:
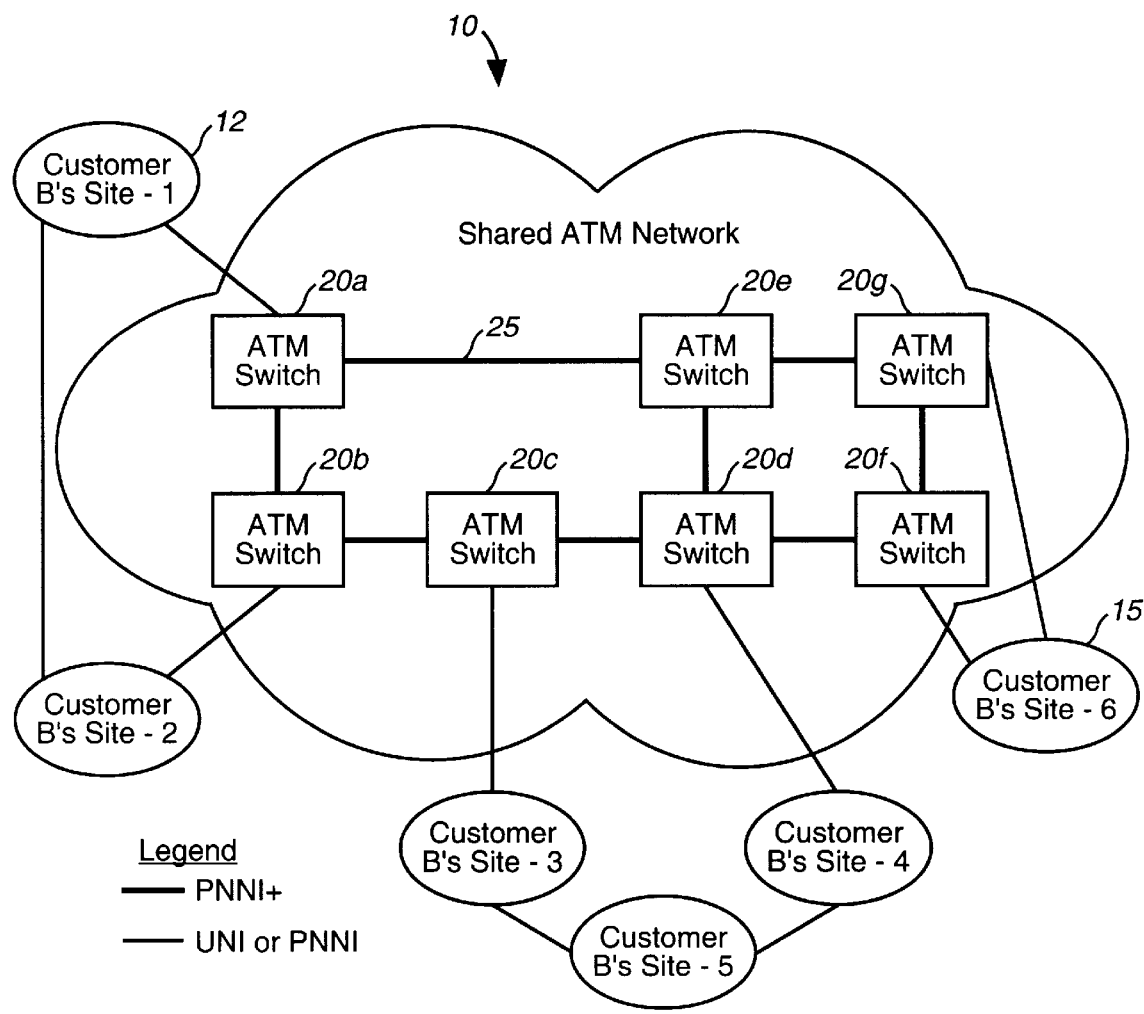
FIG. 1 illustrates the basic components of an ATM Network.
Figure 2:
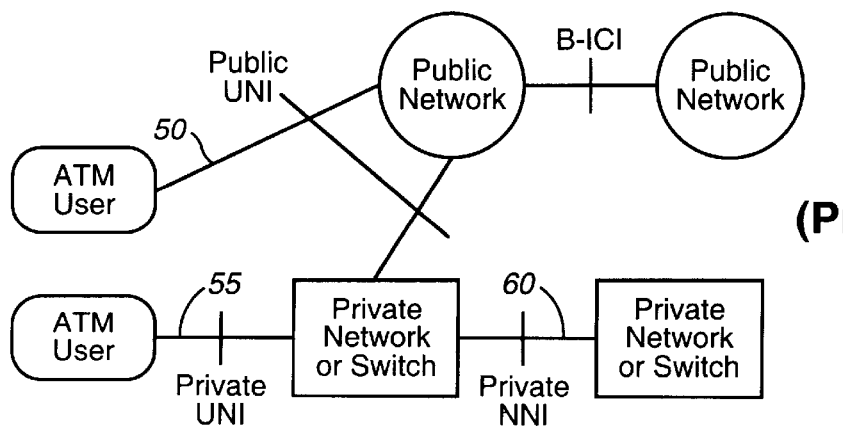
FIG. 2 illustrates the types of interfaces and signaling procedures available for routing signals over and between networks.
Figure 3:
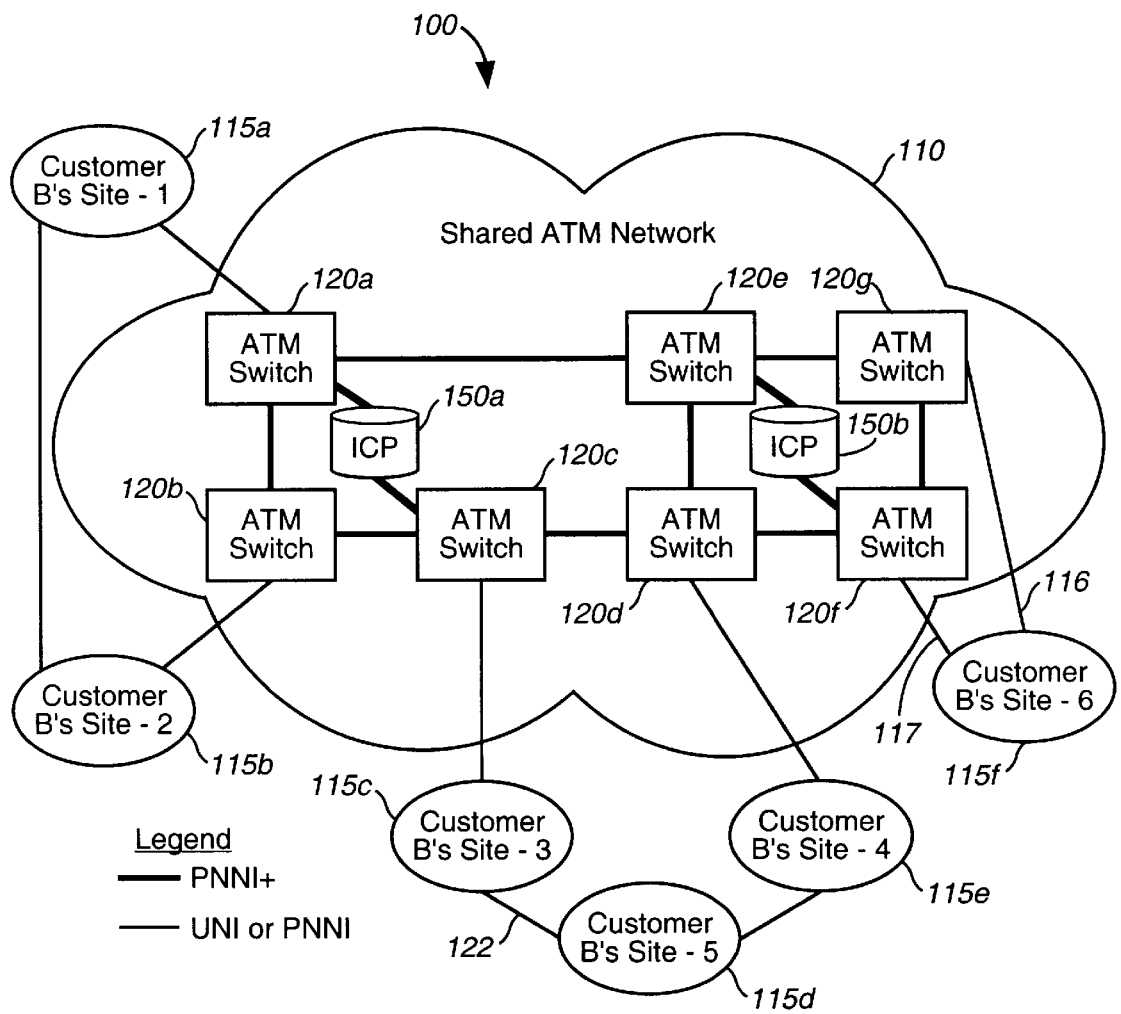
FIG. 3 illustrates the basic components of the ATM Virtual Private Network (VPN)Architecture of the invention.

The ATM Virtual Private Network (VPN) Architecture 100 depicted in FIG. 3 comprises customer sites 115a–115f, ATM switches 120a–120g, and Intelligent Network Control Processors ("ICPs") 150a and 150b that comprise components for emulating an ATM network switch (node), i.e., it is addressed the same way as an ATM switch, and looks like an ATM switch to the other actual ATM switches in the network. As will be described, the implementation of ICP's 150a,b enables VPN services over the ATM network. Each ICP preferably is embodied by a high-performance computer processor, such as a DEC Alpha or IBM RS/6000 computing platform, and may be a single computer or a distributed computing platform.

The ATM switches 120a–120g and ICPs 150a,b communicate with each other and are connected by an extended PNNI protocol (referred to herein as "PNNI+") within a shared ATM network 110. Although FIG. 3 shows only a single customer, denoted as customer "B," connected to ATM switches in the shared network, the network is of the type that may be used in support of data services provided to multiple customers. In addition to being connected to the shared ATM network, customer "B" has dedicated private line connections, e.g., connection 122 between some of their sites. It should be understood that the invention extends to networks with any number of ATM switches and any number of ICPs. There are two ICPs shown in the FIG. 3, with an ICP connected to multiple ATM switches. In any particular embodiment of this architecture, any number of ATM switches can be connected to any number of ICPs depending upon the characteristics of the traffic carried on the network. For instance, if it is expected that there will be a high volume of new connections requiring setup, there would need to be a large number of ICPs to handle the load.

The present invention employs ATM hierarchical routing to define customer Virtual Private Networks (VPN) within a shared ATM network. A VPN is overlaid on the ATM switch network by using Source and Destination addresses that are specific to a customer's VPN plan, and are not recognized by the ATM switches. The ATM switch network uses internal addressing that is different than customer VPN addressing. Thus, in the ATM hierarchical routing scheme ATM switches comprise lower-level networks; specifically, those that recognize and route internal addresses. The ICPs 150a,b are processing elements having intelligence that recognizes customer VPN addresses, and translates customer VPN addresses to internal addresses that are then used to route customer VPN traffic in the ATM switch network. As will be described, the ICPs 150a,b also validate a DA against the SA in a setup message to ensure a call that is being requested by a customer is to a destination within the customer's VPN. This validation provides security for each customer's VPN within a shared ATM network.

Figure 4:
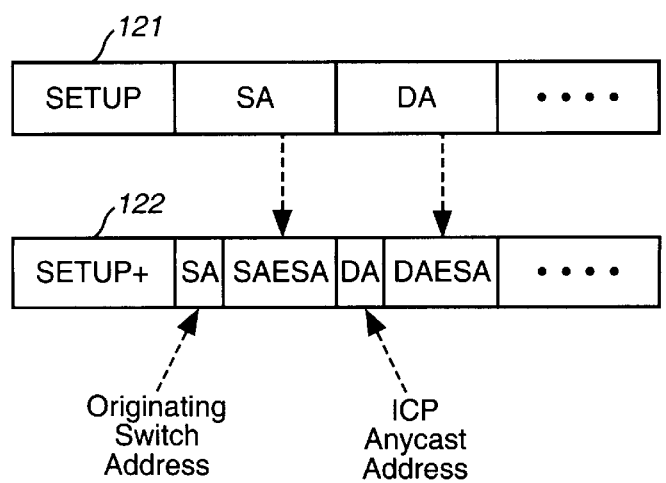
FIG. 4 illustrates the translation of a SETUP message to a SETUP+ message.

The basic methodology for routing VPN calls over the ATM shared network will now be described in view of FIGS. 4(a)–4(c). First, the customer who places a VPN call over the shared ATM network 110 sends a SETUP message over a signaling channel (i.e., ERSCC) to an originating ATM switch, e.g., ATM switch 120a in FIG. 3, in accordance with the UNI protocol. As shown in FIG. 4, the setup message 121 includes a Source Address ("SA") and a Destination Address ("DA"), both of which represent the customer's VPN addresses. Specifically, as shown in FIG. 4, the SETUP message that is internal to the network and which is part of the PNNI between the ATM switch and the ICPs includes four addressing fields, two of which: a Source Address field ("SA") and a Destination Address ("DA") field are standard, and two of which, a Source ATM End System Address ("SAESA") field and a Destination ATM End System Address ("DAESA") field, are non-standard. Thus, the standard SETUP message 121 received by the originating ATM switch has a SA representing the customer source VPN address and DA representing the customer destination VPN address.

Figure 4A:
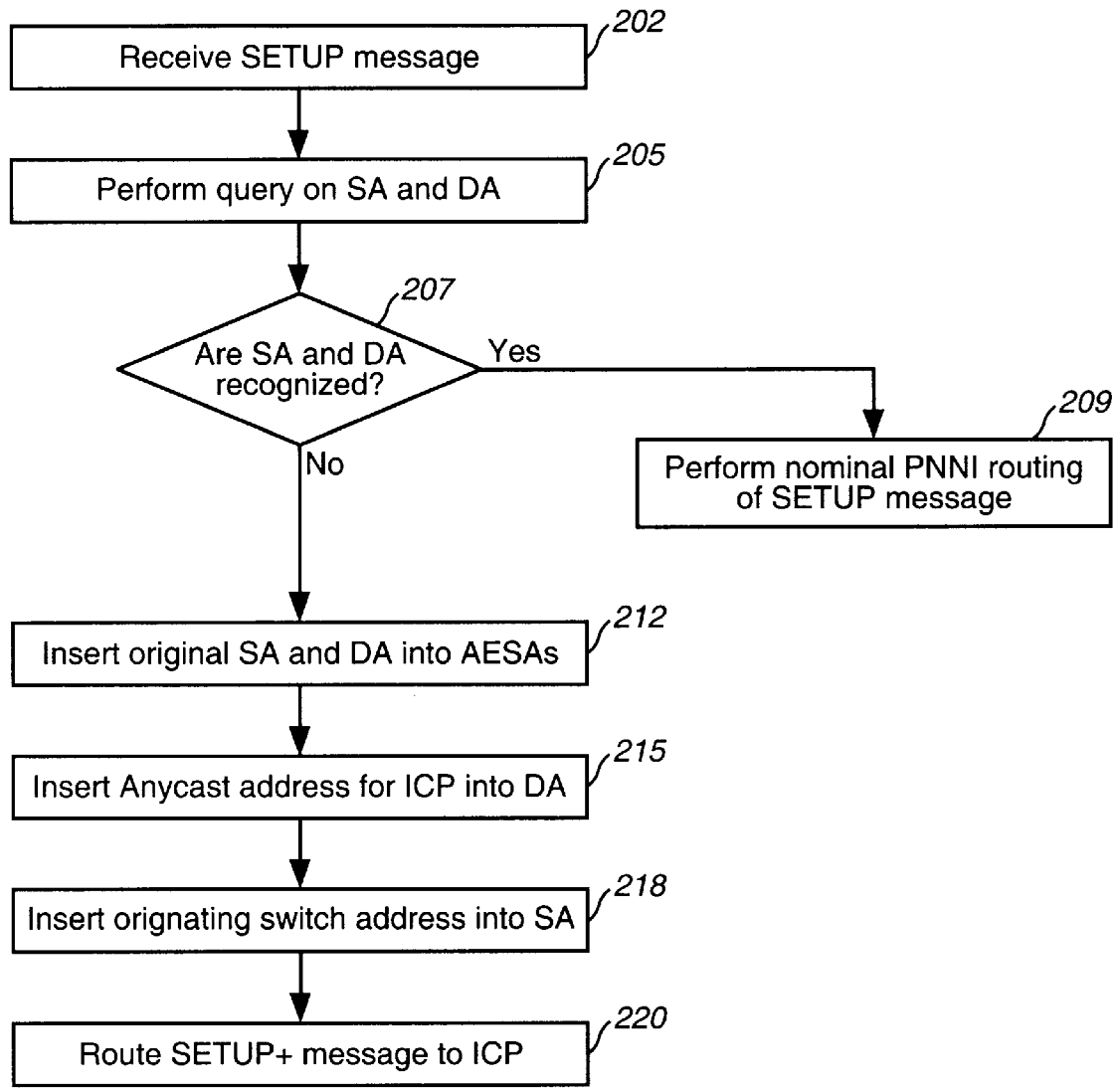
FIG. 4(a) illustrates the process steps for generating a call SETUP+ routing message.

At step 202 in FIG. 4(a), the originating ATM switch receives the SETUP message and, as indicated at step 205, performs a query on the SA and DA address fields. This query can be implemented as a table lookup, other sort of database query, object pointer, or various other well known methods. At step 207, a determination is made as to whether the SA and DA addresses are recognized. If the SA and DA are recognized and found, then the ATM switch routes the SETUP message in accordance with standard PNNI processing, as indicated at step 209 in FIG. 4(a). However, if the SA and DA are not found or recognized, and in accordance with the present invention, the contents of the SA or DA, which are the original VPN source and destination addresses, are placed in the proprietary SAESA and DAESA fields, respectively, as indicated at step 212.

Next, as indicated at step 215, an ICP address is inserted in the DA field. In the preferred embodiment, "Anycast" addressing is used to optimize the routing to an ICP over a virtual signaling channel (IRSCC). At step 218, the originating ATM switch address is inserted into the SA field to form a new SETUP+ message 122 comprising the following address fields, as depicted in FIG. 4: 1) the SA field including the originating ATM Switch port address; 2) the SAESA field having the customer source VPN address value; 3) the DA field including the Anycast address of ICP; and 4) the DAESA field having the customer destination VPN address value. The originating ATM switch also calculates the actual designated transit list "DTL" for routing to the closest ICP using the anycast address, as will be described.

Using hierarchical routing, the ATM switched network routes the SETUP+ message to an ICP, as indicated at step 220, FIG. 4(a). As the SETUP+ message has an internal network address identical in format to that of an ATM switch, the ICPs are used as a higher-level network in the ATM hierarchical routing scheme. Routing to an ICP can be singular (each ATM switch routes to a specific ICP), but in the preferred embodiment, multiple ICPs can each be accessed by each ATM switch using Anycast addressing. Specifically, the Anycast address is a logical group address that can include some or all ICPs in the network. The PNNI protocol allows for point-to-point connections to be established to such anycast group addresses. The standard PNNI algorithm determines the closest ICP member of the group, e.g., the ICP closest to the originating ATM switch. Calculations of the algorithm are not performed on a call-by-call basis, since the results will not change frequently. Implementation of anycast addressing in this manner enables the use of multiple ICPs in the ATM network to promote greater reliability and optimization. As mentioned above, an ATM switch can be directly connected to one or more ICPs, but does not have to be connected to any ICP directly; an ATM switch may route messages to an ICP via another switch.

Preferably, the internal SETUP+ message also includes a field containing a proprietary indicator specifying that no bandwidth should be allocated by intermediate ATM switches between the originating ATM switch and the closest ICP referenced by the Anycast address. The SETUP+ message also includes the standard quality of service parameters, such as bandwidth required for the call, peak cell transport rate, etc. from the original setup message.

The high-level processing of the ICP is now described with reference to FIG. 4(b). At step 225, the ICP receives the SETUP+ message from the ATM switch via an augmented PNNI protocol called PNNI+. The ICP executes a service program designed to extract the original VPN SA and DA from the respective SAESA and DAESA fields as indicated at step 228. The ICP then validates the SA and DA fields at step 230 by comparing addresses contained in these fields with valid source and destination address data for each customer's VPN that is stored in a database contained in the ICP. This ensures that the call will be routed to a destination that is within the customer's VPN. Validation may be implemented by performing any well known method, e.g., a database query or object pointer method.

At step 233, a determination is made as to whether the SA and DA is valid for the VPN call setup. If the SA and DA values are invalid, then the call is rejected and the ICP issues a release message to the ATM switch as indicated at step 235. If the SA and DA values are validated, then at step 238 the ICP executes logic to translate the VPN source and destination addresses to the internal network addresses recognizable by the ATM switches. Specifically, the translated DA address becomes the new destination address and is placed in the DA field of the SETUP+ message. The original VPN source and destination addresses are kept in the AESA parameters of the SETUP+ message, as indicated at step 240. Keeping the original VPN source and destination addresses in the SETUP+ message is needed to allow the destination, which may be another network, to process the call.

Next, as indicated at step 241, a determination is made as to whether enhanced features are required or enabled, e.g., whether other features operating on the fields contained within the SETUP+ message are to be performed in the ICP. If enhanced features are to be processed, then these enhanced features are processed as indicated at step 242. For example, these features and privileges include, but are not limited to: maximum bandwidth per SA or SA prefix group, the common prefix distinguishing one customer's virtual private network from another; maximum calls per SA or SA prefix group, and allowed ATM service category, e.g., rt-VBR, nrt-VBR, CBR, etc., per SA or SA prefix group. These features and privileges may be indexed by the time of day, day of week, or day of year in the ICP.

Alternately, the ICP can execute a program to modify the DTL in the SETUP+ message, to specify the exact path through the ATM network that is to be used to route the SETUP+ message. For example, the ICP may specify a source route that explicitly states every intermediate switch. The DTL stack may include a last element comprising the ICP anycast address and the destination switch (as determined by the first ICP contacted by the originating ATM switch). If the pointer in this DTL is set to the destination switch, and the call arrives at the destination switch, and is blocked, then the destination switch will crankback the call to the ICP anycast address (which may not be the same ICP) according to the PNNI protocol. This ICP may then perform alternate routing to the destination. If the pointer in this DTL is set to the ICP, then enhanced destination processing can be performed prior to call completion by the destination switch.

Additionally, at step 242, the ICP may perform intelligent processing of the SETUP+ message and addresses to provide enhanced calling services. For example, a logical VPN destination address may map to multiple physical destinations. The ICP may execute a particular service program to resolve routing to a single physical address and may implement load balancing algorithms, termination availability routing, time of day and day of week routing, and numerous other types of VPN over ATM routing functions.

Then, as indicated at step 243, the SETUP+ message is returned from the ICP to the originating ATM switch, i.e., its previous node, using the standard PNNI crankback mechanism.

As indicated at step 245, the originating ATM switch uses the translated DA, which is an internal network address to route the SETUP+ message through the ATM switch network to a terminating ATM switch. Each ATM switch processes the SETUP+ message to confirm it can process the call, based on QOS parameters, bandwidth required, a recognizable DA, etc., with each ATM switch reserving bandwidth for the call.

Upon receipt of the SETUP+ message at the terminating ATM switch, a process is performed whereby the original customer VPN destination address is extracted from the DAESA field and placed in the DA field of the SETUP message. Likewise, the original customer VPN source address is extracted from the SAESA field and placed in the SA field of the SETUP message. The original customer VPN addresses are used by the customer's destination site. The terminating ATM switch then routes the SETUP message to the customer's destination site via UNI.

It should be understood that the processing of the SETUP+ message by each ATM switch sets up a VCC/VPC to transport the customer's traffic as ATM cells over bearer channels.

If, for some reason, the terminating ATM switch cannot route the SETUP+ message to the destination, it uses crankback to route the message to an ICP which is a non-standard procedure in the destination switch. This may be the same or different ICP than the ICP that first received the SETUP+ message. The message includes the original customer VPN source and destination addresses, so that the ICP may use these, if needed, to determine an alternate DA. The ICP performs overflow routing by determining an alternate DA that addresses the same customer destination, but uses a different internal network address to do so. An internal network address points to an ATM switch port, so an alternate DA will route the message to the same destination via another ATM switch port. The ICP adds the alternate DA to a SETUP+ message, and uses crankbank to send this message to the first terminating ATM switch which then routes the SETUP+ message to the alternate DA, which may or may not be on another ATM switch. This method allows completion of a call even if the terminating port is on a different switch. For example, with reference to FIG. 3, the first choice UNI 117 shown connecting ATM switch 120*f* to customer B's site 6. If UNI 117 is congested or fails, then ATM switch 120*f* cranks back the call to ICP 150*b*, which inserts an alternate DA identifying ATM switch 120*g*, UNI 116 as the alternate destination.

Figure 5:
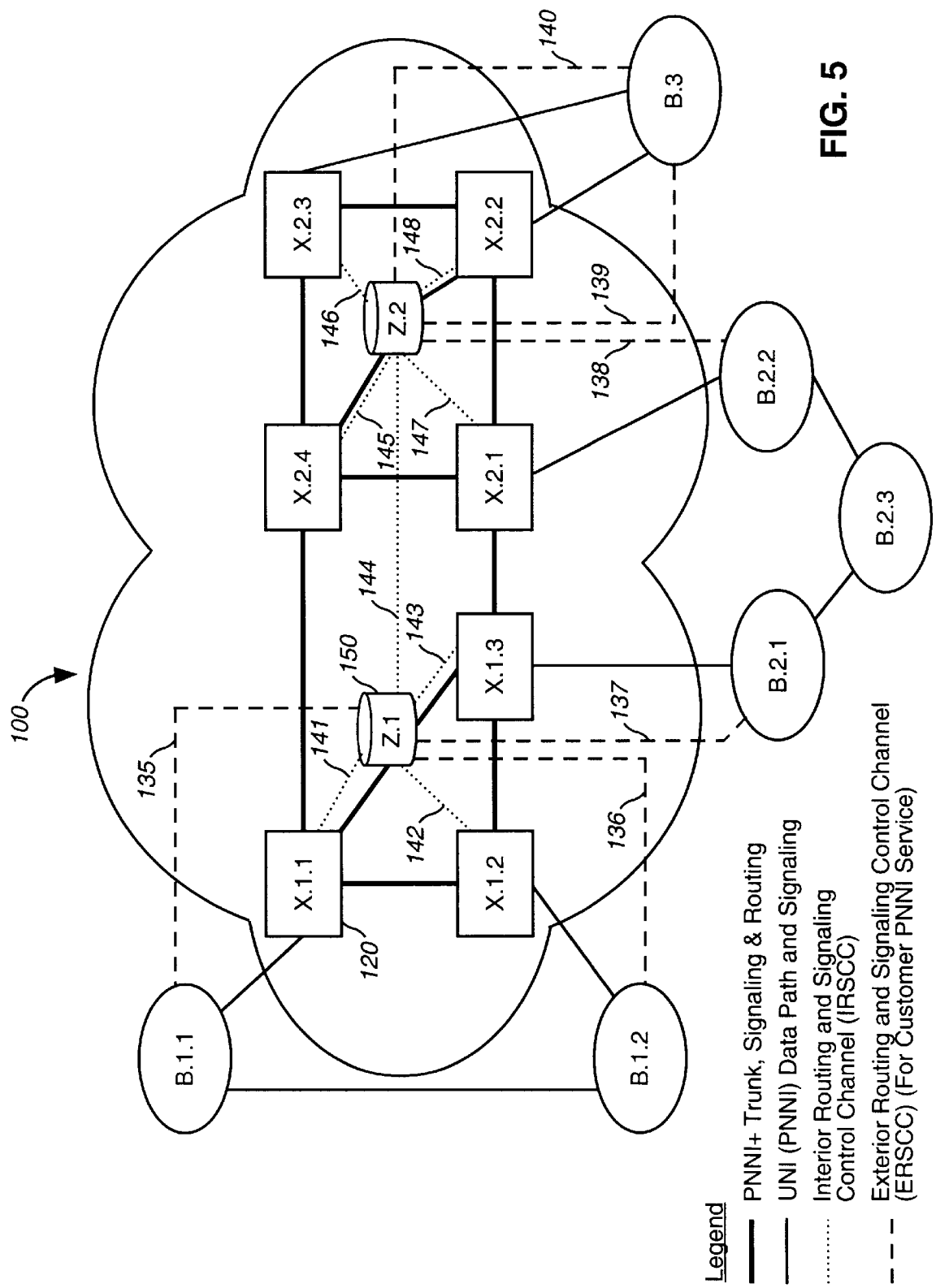
FIG. 5 illustrates an example of addressing employed in the system architecture 100 of the invention.

FIG. 5 illustrates an example of addressing employed in the system architecture 100 of the invention. Addresses are represented in the shorthand notation of the form "a.b.c" as commonly used in the ATM Forum PNNI specification. This format illustrates common prefixes in the 20 octet NSAP-based address format specified in the ATM Forum's signaling specification. In FIG. 5, the first character of the address of all the customer sites is represented as "B", the ATM switches are represented as "X" and the ICPs are represented as "Z".

The interfaces between customers and network ATM switches carry both user data as well as signaling per ATM standards over an ATM User-Network Interface (UNI). optionally, user signaling channels may be directly connected to an ICP. Another option is for the network to provide PNNI routing services to the customers using exterior routing and signaling control channels ("ERSCCs") 135–140 as shown in FIG. 5.

Within the network, PNNI+ interfaces between ATM switches carry user data, PNNI+ signaling as well as "X" network level PNNI Routing information. The ATM switches extend the PNNI protocol by setting up Interior Routing and Signaling Control Channels ("IRSCCs") 141–148 to the ICPs using Anycast addresses to the "Z" prefix. As described, the anycast address locates the "nearest" node which supports the functions associated with the anycast address. Use of anycast between the switches and the ICPs provide benefits such as: 1) it allows the ICPs, Z.1 and Z.2, to act as backups for each other; and 2) the "nearest" node mapping of anycast routing provides load balancing across the ICPs by manipulation of the PNNI metrics that define "nearest". These metrics include administrative cost, available bandwidth, and QoS. In addition to providing connectivity between the switch and the IP, IRSCC logical links also interconnect ICPs so that they can act as backups to each other, as well as enabling the ICPs to converge upon a common network wide view using the PNNI+ protocol.

In the case where the network provides PNNI service to customers, the ATM switches connect the user's PNNI routing control channel (by default on VPI=O, VCI=17) to the nearest ICP using the same anycast address. This is done by switch configuration to prevent any user from masquerading as an "X" prefix node and gaining access to the interior routing protocol. These connections are called Exterior Routing and Signaling Control Channels (ERSCCs) 135–140 as shown in FIG. 5.

The ICP nodes ("Z" level addresses) are aware of the "X" level physical ATM network topology and status through messages exchanged over the logical ISRCCs links 141–148. The ICP nodes are also aware of all virtual private network addresses (e.g., "A", "B", "C", etc.) as well as subscription parameters ordered by different VPN customers.

Figure 6:
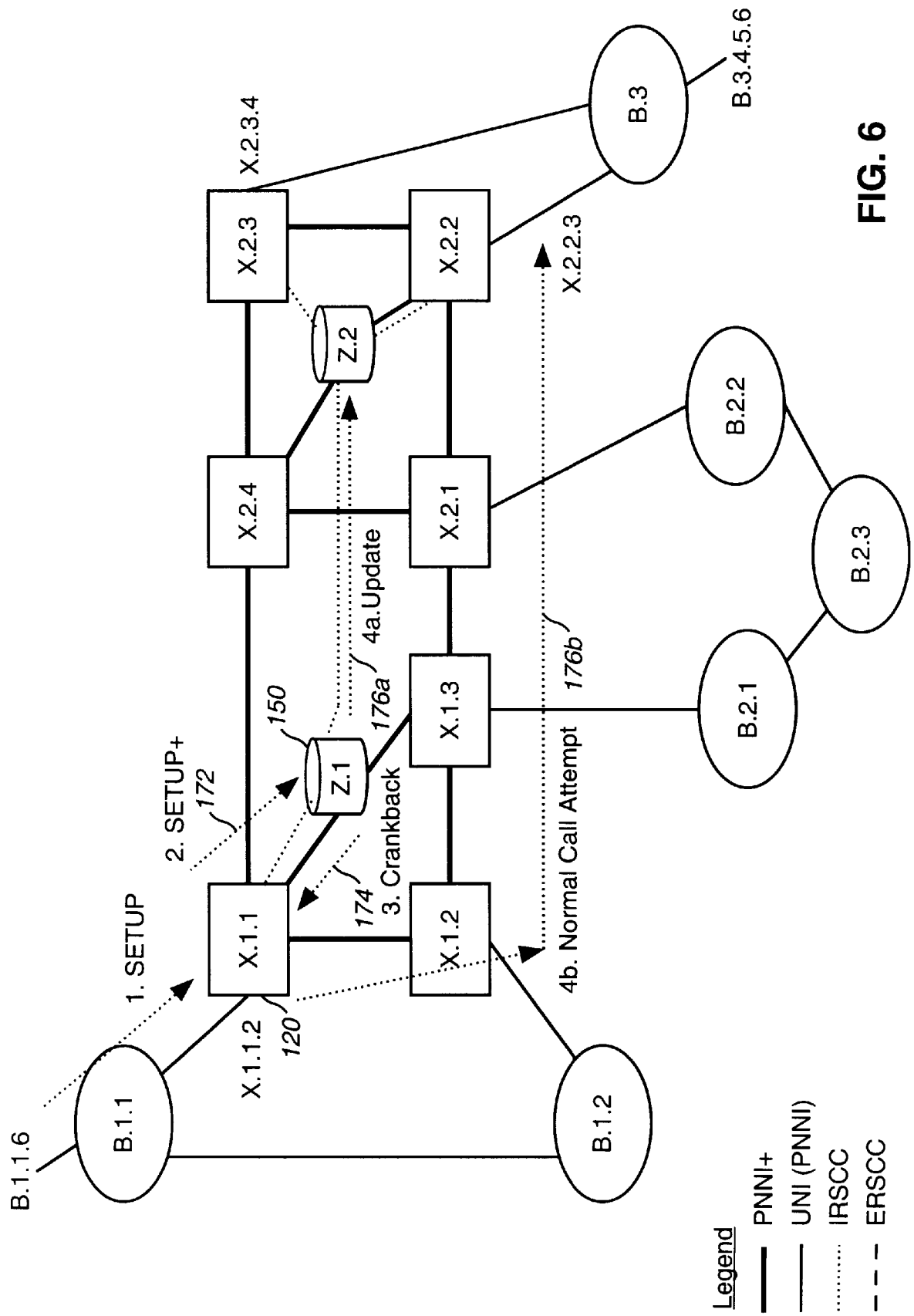
FIG. 6 illustrates an example of routing a basic call between two VPN customers in the shared ATM network.

FIG. 6 illustrates an example of a basic call from customer user with address B.1.1.6 to customer user with address B.3.4.5.6. Customer site B.1.1 (of which user B.1.1.6 is part of by default according to PNNI) is connected to the network via an interface with internal address X.1.1.2. User B.3.4.5.6 is part of customer site B.3 which is dual connected to two network switches via interfaces with internal addresses X.2.2.3 and X.2.3.4 as illustrated in FIG. 6.

Initially, as indicated by arrow 170, the originating user sends a SETUP signaling message through the local ATM network, which determines that the call should be routed to the shared network via interface X.1.1.2. The SETUP message includes Destination Address (B.3.4.5.6) and Source Address SA(B.1.1.6)(See FIG. 4(*a*)).

Then, as indicated by arrow 172, the originating switch, X.1.1, takes this information and creates an expanded setup message SETUP+ and sends it on its IRSCC 141 to the nearest ICP (Z.1). The nearest ICP (Z.1) is located using an anycast address in the "Z" prefix. The SETUP+ message includes the interface address on which the signaling message was received, for example in the AESA parameter. The SETUP+ message reserves no bandwidth on the network since it is sent over the IRSCC virtual connection to the nearest ICP. The ICP has knowledge of the customer's logical configuration and physical interconnection to the network, either via order entry data or via a dynamic routing service.

Next, as indicated by arrow 174, the ICP translates the destination address (B.3.4.5.6) into the physical network X address (X.2.2.3). This translation is performed by using the interface address (i.e., X.1.1.2) included in the SETUP+ message to identify the customer and associated dial plan for this call. The dialed number in the DAESA is used as a look-up into the routing plan to determine the physical X level network address. A modified SETUP+ message is now created with SA(X.1.1.2) and DA(X.2.2.3) and the original SA and DA in ATM End System Address (AESA) parameters. This modified SETUP message is then "cranked back" over the IRSCC to the originating switch X.1.1. "Crankback" is part of the PNNI protocol as described in the standards published by the ATM Forum. As part of the intelligence provided by the ICP, the ICP can fill in the Designated Transit List of the SETUP+ message. For example, a DTL can specify a last-in first-out stack of address lists for routing the message as follows: X.1.1, X.1.2, X.1.3; X.2.1 X.2.2, where the underlined element is the element that is to be processed next in the address lists. This DTL forces the call to take this particular route, for example, to minimize delay as signaled, or subscribed to, by customer B. Alternately, the ICP could have left the routing entirely up to the ATM switch network by returning no DTL at all. The SETUP+ message effectively acts as a proxy setup message to the ATM switch. The Source Address (X.1.1.2) identifies the originating interface.

Finally, the steps indicated by arrows 176a and 176b proceed in parallel. As indicated by arrow 176a, ICP having address Z.1 updates the other ICPs (only Z.2 in this simple example) if the call attempt results in a significant change in state that must be known to other ICPs in the network, for example, if the call is a relatively large bandwidth call. As indicated by arrow 176b, the normal call attempt is performed according to the PNNI standard between the ATM switches by the ICP as illustrated in the FIG. 6. If the ICP did not specify an explicit route, via DTL, in the cranked back signaling message, then the ATM switches would select a path from X.1.1 to X.2.2 using a switch based algorithm. In the preferred embodiment, however, it is the algorithm implemented in the ICP that determines the DTL to "reserve" bandwidth for specific customer VPNs.

As switches connect the call, they communicate significant state changes to the ICPs to which they currently have an IRSCC session established. If the call completes to the destination switch and the destination switch interface is functional and can accept the additional connection, then the destination switch replaces the SA and DA fields in the signaling message with the DA and SA parameters in the AESA fields and sends the signaling message to customer site B.3. Normally, customer network B.3 would then complete the SVC call to destination address B.3.4.5.6.

Figure 7:
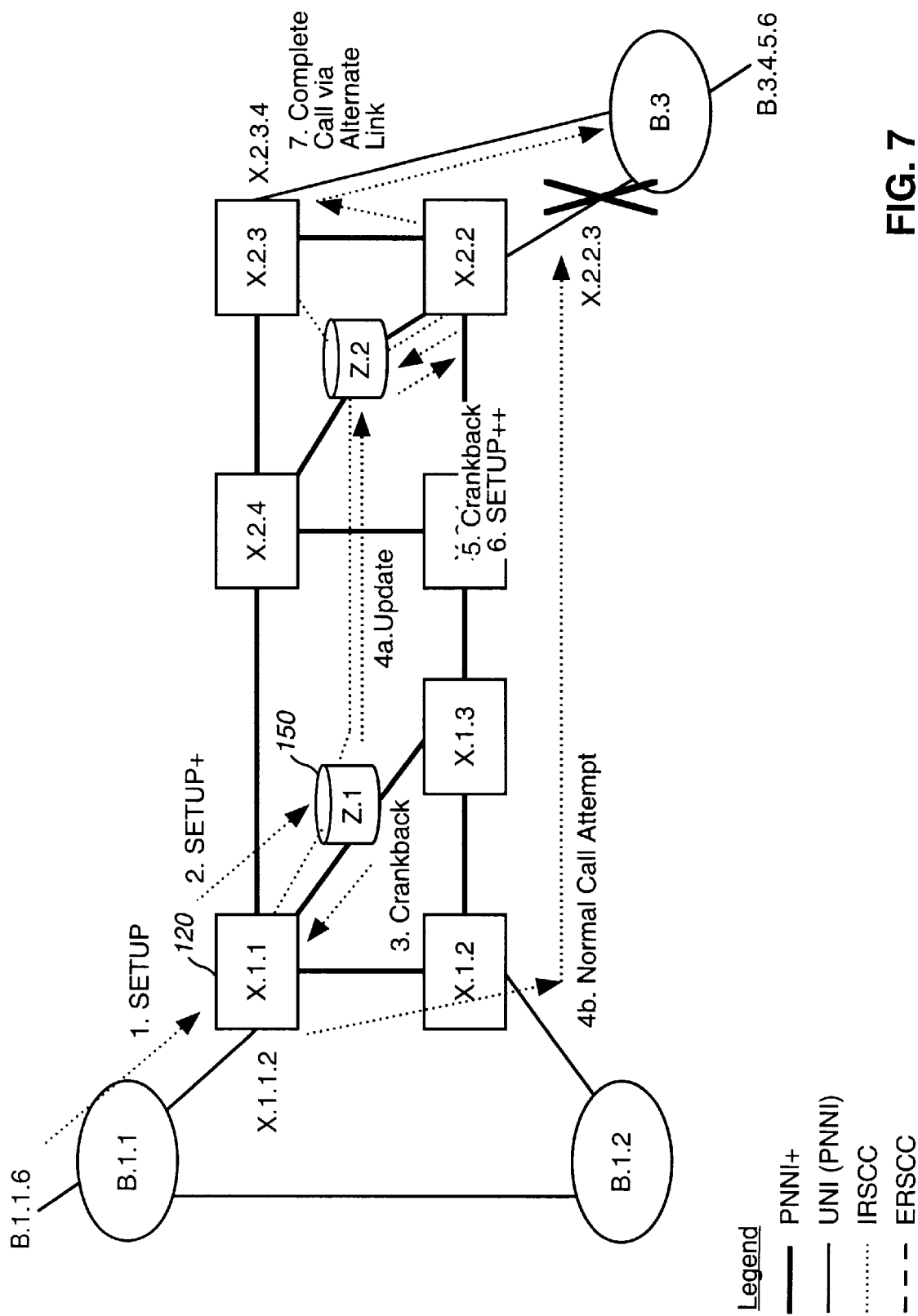
FIG. 7 illustrates an example of routing a basic call between two VPN customers in the shared ATM network when the destination ATM switch link fails or is congested.

FIG. 7 illustrates the same example network and call as described with reference to FIG. 6, however, the destination interface X.2.2.3 either fails, or is congested when the call attempt arrives at switch X.2.2 destined for customer site B.3. Specifically, switch X.2.2 cranks back the SETUP message to the Z level in the hierarchy in step 5. This special level of the hierarchy reserves no bandwidth and through automatic discovery of the network along with the dual homed nature of B.3 ICP node Z.2 then returns revised SETUP message (SETUP+) in step 6. The network then completes the call via the alternate link to the destination in step 7.

Note that in normal PNNI, a destination which is dual homed may become blocked even if the alternate link could complete the call. In the implementation described by this disclosure, the call always completes if resources are available.

Figure 4B:
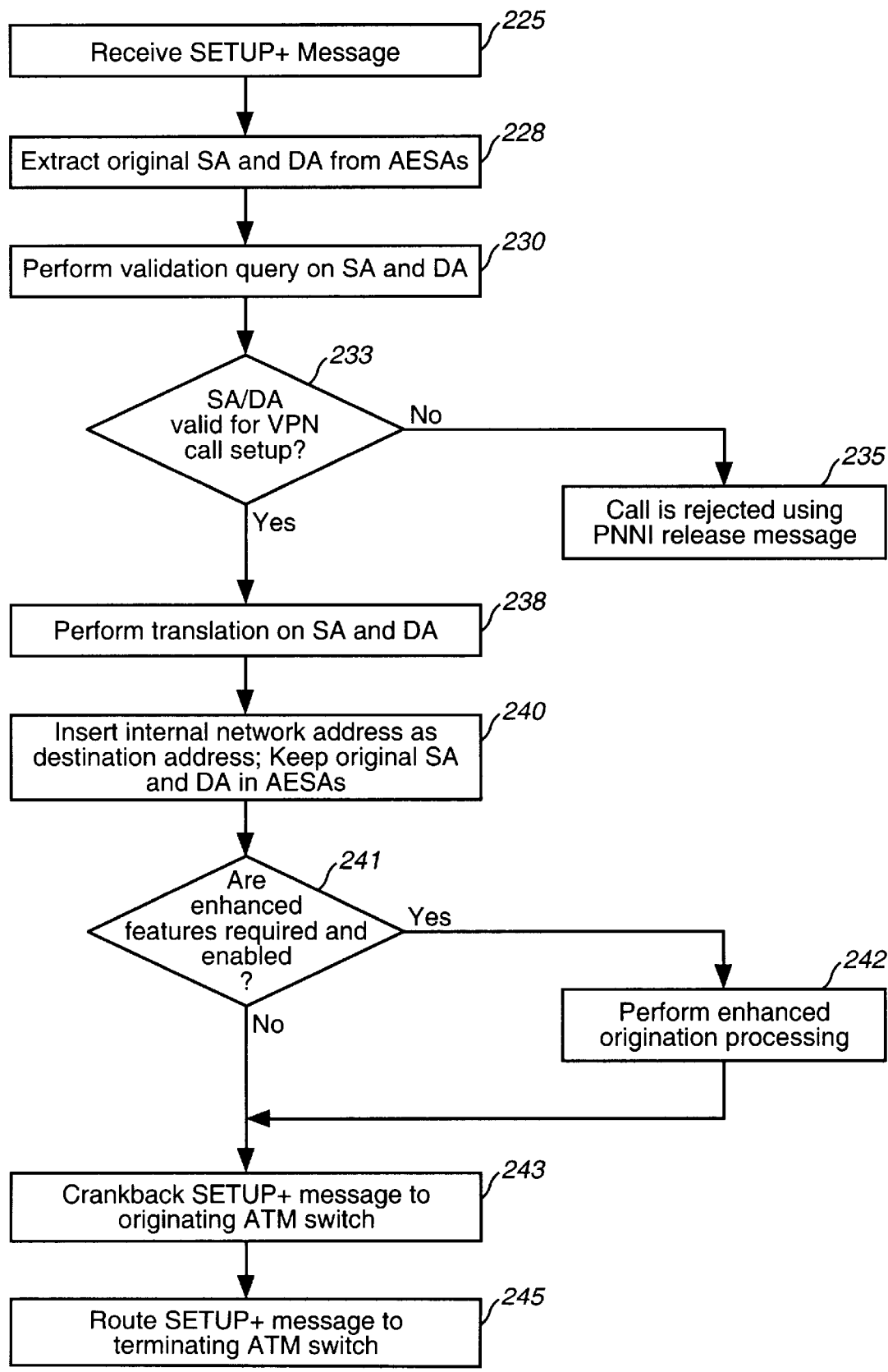
FIG. 4(b) illustrates the process steps implemented by an ICP for processing the call SETUP+ message.
Figure 4C:
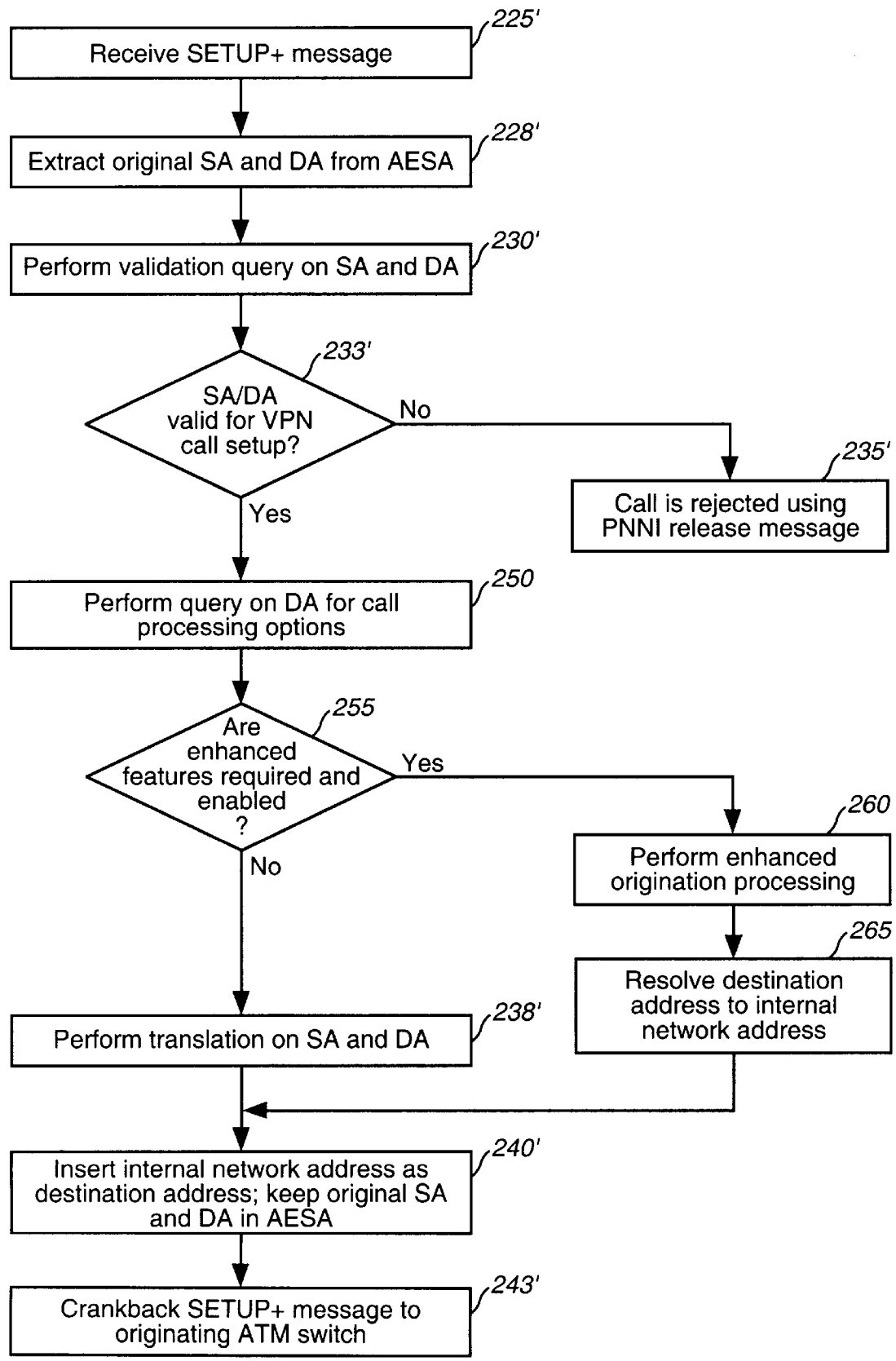
FIG. 4(c) illustrates the process steps implemented by an ICP for performing enhanced call processing features.

FIG. 4(c) is a flowchart illustrating a slight variation to the process of a simple routing address translation that enables basic VPN services over ATM as depicted in FIG. 4(b). Specifically, FIG. 4(c) shows an example of a process that may be performed by the ICP to enable enhanced calling features that may be provided as part of setup message processing by the ICP closest to the destination.

In the example illustrated in FIG. 4(c), steps 225'–235', VPN address validation is performed in the same manner as described with respect to corresponding steps 225–235 shown in FIG. 4(b). However, as indicated at step 250 in FIG. 4(c), a query on the original DA is performed to determine if any call processing options are enabled. Thus, at step 255, a determination is made as to whether enhanced features are to be processed. If enhanced features are to be processed, then these enhanced features are processed as indicated at step 260. Enhanced calling features that may be enabled by the basic system architecture described herein include: multiple destination routing features such as: scheduled routing, e.g., time of day routing, destination load balancing, dynamic virtual routing, ICP load balancing techniques, e.g., based on round robin or dynamic cost determination among ICP links. Other enhanced VPN over ATM service features that may be implemented in the ICP includes: video, data, voice, and multimedia conferencing; account management for providing customized billing and reporting features; and other features inherently characteristic of shared ATM networks such as: bandwidth management, Intranet/Extranet authentication, screening and closed user groups, guaranteed virtual trunking capacity, virtual routing, and intelligent networking management and accounting services. The enhanced processing features and privileges discussed herein with respect to FIG. 4(b), step 242, can be performed as well.

Enhanced feature processing generally results in a destination address translation to an internal network address, based on any number of parameters other than just the SA, as indicated at step 265. If enhanced features are not to be processed, then, the process performs steps 238'–243' corresponding to steps 238–243 as shown and described above with respect to FIG. 4(b).

In the preferred embodiment, the ICP 150 comprises the software and hardware elements capable of providing the call processing and other intelligent call routing services for calls received at the ATM switches. Particularly, upon receipt of the call from the ATM switch, one or more managed objects providing a specific call processing service may be launched within a general purpose platform-independent computing environment for processing the received call. Although not shown, the ICP may include one or more Protocol gateway elements having a respective Network Interface Card for physical connection to the switching fabric, i.e., the ATM switch. Besides providing the physical interface, the Network Interface Cards handles the lower layer processing of the ATM protocol. Each ICP controls the routing of the calls within the resource complex comprising the ATM switching network. In this manner, ICP may be considered part of a higher-level processing network that is separate and distinct from the ATM switching network.

The foregoing merely illustrates the principles of the present invention. Those skilled in the art will be able to devise various modifications, which although not explicitly described or shown herein, embody the principles of the invention and are thus within its spirit and scope. For example, actual implementations of the processing shown and described with respect to FIGS. 4(a)–4(c) may vary in accordance with the switching software technology employed. Additionally, in other embodiments, VPN address validation can occur after enhanced feature processing, or as part of enhanced feature processing.

What is claimed is:

1. A system for providing virtual private network services over an ATM network shared by multiple users, said ATM network having a plurality of ATM switches interconnected by links, each ATM switch adapted for routing ATM call traffic within said public ATM network, said system comprising:

an interface means for generating a call setup message associated with a private network call to be routed within said public ATM network, said setup message comprising information including original source address of a call initiator and an original destination address of a call recipient subscribed to said private network;

a processing network having intelligence and including control processing nodes interconnected with one or more ATM switches of said public ATM network;

means implemented in said ATM switch for receiving said setup message and for modifying said setup message to include an address of a said control processing node while embedding said original source and destination addresses within said modified setup message; and means for routing said modified setup message from an ATM switch to a proximate control processing node at said address specified in said modified setup message, said control processing node comprising means for converting said embedded original source and destination addresses of said modified setup message into ATM network addresses recognizable by said ATM switches and routing said modified setup message back to said ATM switch for enabling said private network call to be routed over said public ATM network, and means for validating said embedded original source and destination addresses of said modified setup message.

2. The system as claimed in claim 1, wherein said means for modifying said setup message includes means for inserting an address of any control processing node in said processing network.

3. The system as claimed in claim 1, wherein said means for routing said modified setup message from an ATM switch to a control processing node includes routing said modified setup message through one or more intermediate ATM switches.

4. The system as claimed in claim 1, wherein said control processing node further includes means for appending to said modified setup message a designated transit list specifying a specific route for said private network call through said public ATM network.

5. The system as claimed in claim 1, wherein said control processing node including means for returning said modified setup message back to an ATM switch for routing said call through said public network includes a crankback mechanism.

6. The system as claimed in claim 1, wherein said control processing node includes means for performing enhanced call processing features, said means for validating including means for determining whether enhanced call feature processing is to be performed.

7. The system as claimed in claim 1, wherein said ATM network addresses recognizable by said ATM switches includes an address of a terminating ATM switch connected with said call recipient, said modified setup message being routed to said terminating switch.

8. The system as claimed in claim 7, wherein said terminating ATM switch extracts said embedded original source and destination addresses enabling completion of a call setup for routing said call to said call recipient.

9. The system as claimed in claim 7, further including means implemented in said ATM switch for routing said modified setup message back to a said control processing node to re-route said modified setup message to said destination address via an alternate ATM switch.

10. The system as claimed in claim 1, wherein said means for modifying said setup message includes means for preventing allocation of bandwidth at said one or more intermediate ATM switches when routing said modified setup message to a control processing node through one or more intermediate ATM switches.

11. An apparatus for providing private network message routing services for multiple customers within a shared ATM network having a plurality of ATM switches interconnected by links, each ATM switch adapted for routing ATM call traffic within said shared ATM network in accordance with an ATM routing protocol, said apparatus comprising:

an interface means for generating a first setup message corresponding to a call initiated by a private network caller at a source location and routing said first setup message to a first ATM switch, said first setup message identifying a unique private network source address of said caller and a unique private network destination address of a call recipient;

means implemented in said originating ATM switch for converting said first setup message to a second setup message, said second message having said unique private network source address and said unique private network destination address included therein;

one or more intelligent control processing means interconnected with each ATM switch and adapted to receive said second setup message from an ATM switch, each control processing means for recognizing said unique private network source and destination address of said call and modifying said unique private network source and destination address in said second message into internal source and destination addresses recognizable by said ATM switches; and means implemented in said control processing means for returning said modified second setup message back to said originating ATM switch, said ATM routing protocol setting up a signal path for routing said ATM call between said private network caller and said recipient, said control processing means further comprising means for validating said unique private network source and destination addresses associated with said caller.

12. The apparatus as claimed in claim 11, wherein said ATM routing protocol is a hierarchical message routing scheme.

13. The apparatus as claimed in claim 11, wherein said ATM routing protocol functions in accordance with a PNNI protocol.

14. The apparatus as claimed in claim 11, wherein said validating means includes means for accessing valid private network source and destination addresses associated with said caller and comparing them with said private network source and destination addresses included in said second setup message.

15. The apparatus as claimed in claim 13, wherein said means implemented in said control processing means for returning said modified second setup message back to said first ATM switch includes a crankback mechanism implemented in PNNI.

16. The apparatus as claimed in claim 11, wherein said means implemented in said control processing means for returning said modified second setup message back to said first ATM switch includes a designated transit list specifying one or more switches interconnected for routing said ATM call within said shared ATM network.

17. The apparatus as claimed in claim 11, further including means enabling overflow call routing by determining alternate addresses when said modified second setup message cannot be routed through an ATM switch.

18. The apparatus as claimed in claim 11, wherein said interface means generates and routes said first setup message in accordance with a UNI standard protocol.

19. A method of providing private network message routing services for multiple customers within a shared ATM network having a plurality of ATM switches interconnected by links, each ATM switch adapted for routing ATM call traffic within said shared ATM network in accordance with an ATM routing protocol, said method comprising:

(a) generating a first setup message corresponding to a call initiated by a private network caller at a source location and routing said first setup message to a first ATM switch, said first setup message comprising a unique private network destination address of a call recipient;

(b) converting said first setup message to a second setup message having said unique private network source address and said unique private network destination address included therein;

(c) routing said second setup message from said ATM switch to one or more intelligent control processing means and interconnected with said ATM switch and adapted to recognize said unique private network source and destination address of said call;

(d) modifying said unique private network source and destination address included in said second message into internal source and destination addresses recognizable by said ATM switches, said step of modifying said second message further including the step of validating said unique private network source and destination addresses associated with said caller;

(e) returning said modified second setup message back to said originating ATM switch; and enabling said ATM routing protocol to set up a signal path for routing said ATM call between said private network caller and said recipient based on said modified second setup message.

20. The method according to claim 19, wherein said enabling step (f) includes implementing a hierarchical message routing scheme for routing said ATM call between said private network caller and said recipient.

21. The method according to claim 20, wherein said hierarchical message routing scheme functions in accordance with an ATM PNNI protocol.

22. The method according to claim 19, wherein said validating step includes the steps of:

accessing valid private network source and destination addresses associated with said caller; and comparing said valid private network source and destination addresses with said private network source and destination addresses contained in said second setup message.

* * * * *